(12) United States Patent
Tomita (10) Patent No.: US 9,606,310 B2
(45) Date of Patent: Mar. 28, 2017

(54) SEALING STRUCTURE OF OPTICAL COMMUNICATION MODULE AND SEALING METHOD OF THE SAME (71) Applicant: NEC Corporation, Tokyo (JP)

(72) Inventor: Isao Tomita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/036,670

(22) PCT Filed: Nov. 10, 2014

(86) PCT No.: PCT/JP2014/005643
§ 371 (c)(1),
(2) Date: May 13, 2016

(87) PCT Pub. No.: WO2015/072131
PCT Pub. Date: May 21, 2015

(65) Prior Publication Data
US 2016/0282574 A1 Sep. 29, 2016

(30) Foreign Application Priority Data
Nov. 15, 2013 (JP) ................................. 2013-236642

(51) Int. Cl.
G02B 6/42 (2006.01)
B23K 1/20 (2006.01)

(52) U.S. Cl.
CPC ......... G02B 6/4248 (2013.01); G02B 6/4204 (2013.01); G02B 6/4238 (2013.01);
(Continued)

(58) Field of Classification Search
None
See application file for complete search history.

(56) References Cited

U.S. PATENT DOCUMENTS 4,880,290 A * 11/1989 Kumazawa ............ G02B 6/245
                                                          385/95
5,150,230 A *  9/1992 Masuko ................. G02B 6/327
                                                           359/34
(Continued)

FOREIGN PATENT DOCUMENTS

CN   102436045 A   5/2012
JP   62-32565      2/1987
(Continued)

OTHER PUBLICATIONS

English translation of written opinion for PCT/JP2014/005643, mailing date Feb. 10, 2015.*
(Continued)

Primary Examiner — Mike Stahl
(74) Attorney, Agent, or Firm — Finnegan, Henderson, Farabow, Garrett & Dunner, L.L.P.

(57) ABSTRACT

In a sealing structure of optical communication module using a sealing material, it has been difficult to secure the reliability without influencing optical fiber characteristics. A sealing structure of optical communication module of the present invention comprises: a cylindrical barrel unit fixed to a package; a cylindrical flange which is disposed inside the barrel unit and through which an optical fiber pierces; and a sealing material disposed between the barrel unit and the flange, wherein the flange has on its surface a plurality of regions having different surface conditions, and the sealing material is disposed in only one of the regions.

15 Claims, 6 Drawing Sheets (52) U.S. Cl.
CPC ......... *G02B 6/4249* (2013.01); *G02B 6/4251* (2013.01); *G02B 6/4265* (2013.01); *B23K 1/20* (2013.01)

(56) References Cited

U.S. PATENT DOCUMENTS

| | | | | |
|---|---|---|---|---|
| 5,588,086 | A * | 12/1996 | Fan | G02B 6/3816 174/11 R |
| 5,970,194 | A * | 10/1999 | Dunn | G02B 6/4248 385/94 |
| 2001/0033729 | A1 | 10/2001 | Kuroha | |
| 2002/0126965 | A1 | 9/2002 | Miyokawa | |
| 2004/0184753 | A1 | 9/2004 | Teramura et al. | |
| 2014/0374468 | A1 * | 12/2014 | Sakamoto | G02B 6/4238 228/203 |
| 2015/0030293 | A1 * | 1/2015 | Lv | G02B 6/4238 385/88 |

FOREIGN PATENT DOCUMENTS

| | | |
|---|---|---|
| JP | 62-201706 | 12/1987 |
| JP | 2-67508 | 3/1990 |
| JP | 3-242605 | 10/1991 |
| JP | 4-19701 | 1/1992 |
| JP | 7-92355 | 4/1995 |
| JP | 7-191238 | 7/1995 |
| JP | 8-179156 | 7/1996 |
| JP | 2001-215372 | 8/2001 |
| JP | 2002-267891 | 9/2002 |

OTHER PUBLICATIONS

International Search Report and Written Opinion mailed Feb. 10, 2015, in corresponding PCT International Application.
Office Action mailed Sep. 23, 2016, by the Chinese Patent Office in counterpart Chinese Patent Application No. 201480062315.7.

* cited by examiner

SEALING STRUCTURE OF OPTICAL COMMUNICATION MODULE AND SEALING METHOD OF THE SAME

CROSS-REFERENCE TO RELATED PATENT APPLICATIONS

This application is a National Stage Entry of International Application No. PCT/JP2014/005643, filed Nov. 10, 2014, which claims priority from Japanese Patent Application No. 2013-236642, filed Nov. 15, 2013. The entire contents of the above-referenced applications are expressly incorporated herein by reference.

TECHNICAL FIELD

The present invention relates to a sealing structure and a sealing method of an optical communication module, and in particular, to a sealing structure and a sealing method of an optical communication module where solder sealing is employed.

BACKGROUND ART

In association with the recent increase in communication traffic, necessity of expanding the transmission capacity of communications has been increasing. In particular, it is expected that the transmission capacity is expanded by the use of an optical communication network system using light. In such an optical communication network system, a module for performing transmission and reception of optical signals is a key device. Such a module for optical communication is required to have a higher speed and a smaller size, in association with increase in the system's speed and capacity.

In general, a light-receiving module for optical communication is composed of the following components. That is, the components include an optical fiber for transmitting optical signals, a PD (Photo Diode) for performing optical-electrical conversion of optical signals sent from a transmission line, a TIA (Trans Impedance Amplifier) for performing impedance conversion and amplification of the current signals thereof and then outputting the signals in the form of voltage signals, and the like. These components are mounted on a ceramic package or the like, thereby being modularized together. In the modularization, it is important to hermetically seal the components within the package, in terms of securing the reliability of the optical communication module.

Also at a portion for introducing an optical fiber into the package, various hermetic sealing schemes are employed, so as to secure the reliability of the optical communication module. Patent Literature 1 (PTL1) describes an example of such modularization into a package for optical communication, with optical fibers mounted there.

A method of plating the inner surface of a cylindrical member described in Patent Literature 1 (PTL1) is defined to be one which partially plates the inner surface of a cylindrical member (introduction pipe) provided in a package for optical communication. More specifically, it is described that the inner surface of the introduction pipe is partially masked at its portion not to be plated, and in that state, the exposed portion of the inner surface of the introduction pipe is plated. It is then described that the method has an effect that, when fixing an optical fiber to the introduction pipe using molten solder, the molten solder does not penetrate into the package. It is then described that, due to the effect, it becomes possible to prevent either degradation of the sealing quality caused by decrease in the solder amount at the sealing portion of the introduction pipe or degradation of the reliability caused by solder having penetrated into the package.

Patent Literature 2 (PTL2) describes an optical fiber assembly and a sleeve used for the assembly, which are, respectively, an optical fiber assembly for connecting an optical fiber to an optical communication module, and a sleeve attached to an optical fiber cable. It is described that an insertion hole is provided in a housing corresponding to a package for optical communication, the optical fiber assembly is inserted there, and the housing and the sleeve are fixed together by soldering. Patent Literature 3 (PTL3) proposes to join an insulating substrate with a base board by soldering.

More recently, for the purpose of increasing the speed and capacity of optical communications, multi-channelling is increasingly conducted, where a large number of communication channels are set. For example, a configuration provided with four channels each having 10 Gbps capacity or the like has been developed to realize 40 Gbps capacity. In association with such a technology trend of multi-channeling, research and development on multi-channeling also in the inside of an optical communication module has been conducted. Examples of such research and development include that on a configuration where optical fibers for transmitting optical signals are multi-channeled and then an optical fiber array with the optical fibers aligned is used, that on a configuration where the optical fiber array is mounted inside a package, and the like.

CITATION LIST

Patent Literature

[PTL 1] Japanese Patent Application Laid-Open No. Hei 10-251889
[PTL 2] Japanese Patent Application Laid-Open No. 2010-91923
[PTL 3] Japanese Patent Application Laid-Open No. 2001-168492

SUMMARY OF INVENTION

Technical Problem

However, the method of plating the inner surface of a cylindrical member described in Patent Literature 1 (PTL1) has the following problems. Because this method requires providing a structure for preventing solder penetration at a part of the inner surface of the cylindrical member, fabrication and processing of a package including the cylindrical member become complicated. Further, the package of Patent Literature 1 (PTL1) is configured to have a structure where a cap through which an optical fiber pierces is fixed to the cylindrical member by soldering. Because also the optical fiber is accordingly fixed directly by the soldering, it is anticipated that stress is exerted on the optical fiber, thereby causing deterioration in polarization characteristics of the optical fiber. In particular, influence on the polarization characteristics is remarkable in a polarization maintaining optical fiber.

On the other hand, the optical fiber assembly and the sleeve used for the assembly described in Patent Literature 2 (PTL2) have a structure where an optical fiber is embedded in the sleeve, thus not being directly fixed by soldering. However, the structure has the following problem. An area where the sleeve attached to the optical fiber is fixed by soldering in an insertion hole provided at a portion of a housing is limited to only a part of the housing surface where the insertion hole is provided. That is, the length of solder fixing (corresponding to a leak path) is short. Accordingly, it is difficult to secure long-term hermeticity.

As has been described above, with the related sealing structures and sealing methods of optical communication modules, which are described in Patent Literature 1 (PTL1) and Patent Literature 2 (PTL2), it is difficult to secure a long leak path for securing hermeticity without affecting influence on the optical fiber characteristics. Totally saying, there is a problem of difficulty in securing the reliability.

An object of the present invention is to provide a sealing structure and a sealing method of optical communication module which can solve the above-described problem in that it has been difficult, in a sealing structure of optical communication module using a sealing material, to secure the reliability without affecting influence on the optical fiber characteristics.

Solution to Problem

A sealing structure of optical communication module according to the present invention, comprising: a cylindrical barrel unit fixed to a package; a cylindrical flange disposed inside the barrel unit, through which an optical fiber pierces; and a sealing material disposed between the barrel unit and the flange, wherein the flange has on its surface a plurality of regions having different surface conditions, and the sealing material is disposed in only one of the regions.

A sealing method of optical communication module according to the present invention, comprising: disposing a cylindrical barrel unit in a package; inserting into the barrel unit a cylindrical flange through which an optical fiber pierces; filling a gap between the barrel unit and the flange with a molten sealing material; disposing the molten sealing material at only one of a plurality of regions of the outer surface of the flange, the plurality of regions having different surface conditions; and then solidifying the molten sealing material.

Advantageous Effects of Invention

According to a sealing structure and a sealing method of optical communication module of the present invention, the reliability of the optical communication module can be improved without affecting influence on the optical fiber characteristics.

DESCRIPTION OF EMBODIMENTS

Next, exemplary embodiments of the present invention will be described with reference to drawings. In the following description, the same sign will be assigned to components having the same function, in which case their descriptions may be omitted.

First Exemplary Embodiment

Figure 1:
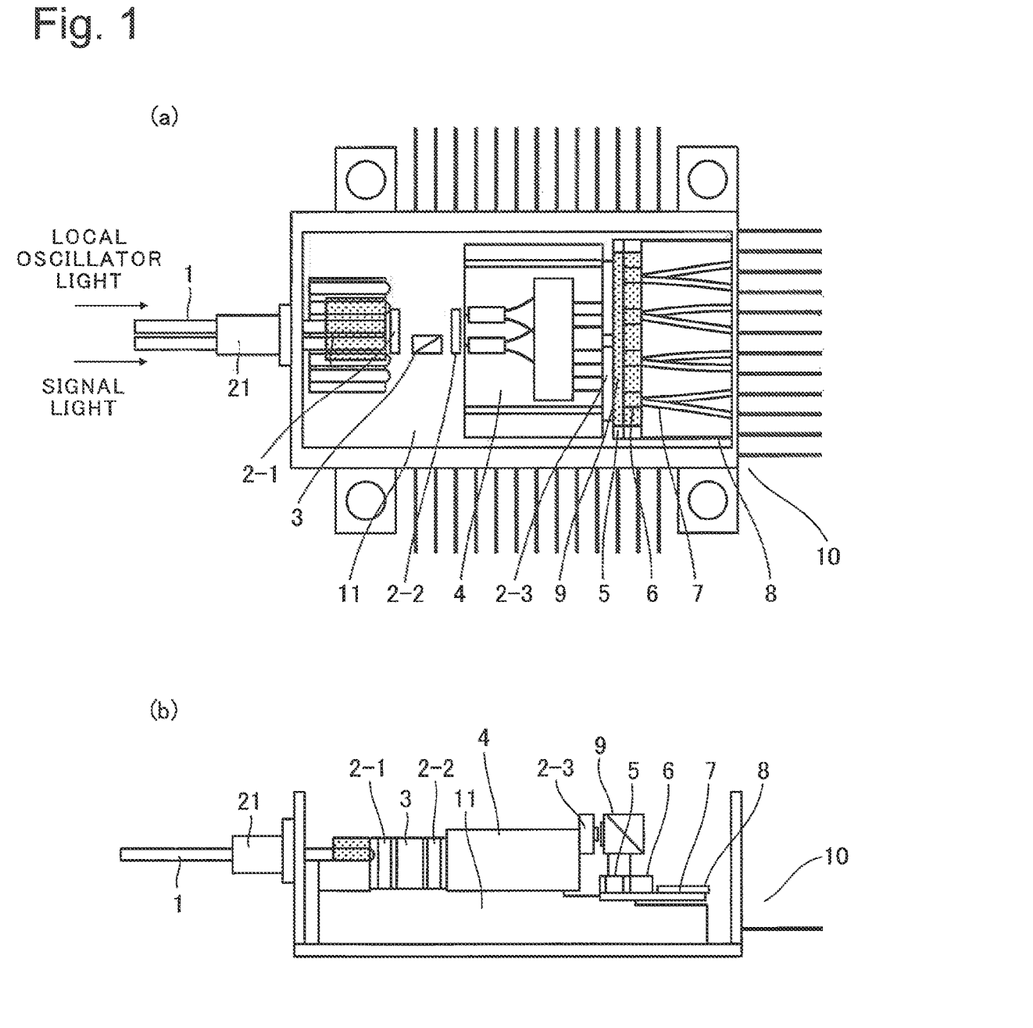
FIG. 1(a) is a top view of an optical communication module according to a first exemplary embodiment of the present invention.
FIG. 1(b) is a side view of the optical communication module according to the first exemplary embodiment of the present invention.

FIG. 1 is a diagram showing an overall configuration of an optical communication module according to a first exemplary embodiment of the present invention, where FIG. 1(a) is a top view and FIG. 1(b) is a side view. The optical communication module consists of a group of components which will be described below.

That is, the optical communication module of the present exemplary embodiment comprises an optical fiber array 1 for allowing signal light and local oscillator light to enter into a package, and a lens 2-1 for collimating the incident light. The optical communication module of the present exemplary embodiment further comprises a PBS (Polarization Beam Splitter) 3 for splitting the signal light into its TE (Transverse Electric Wave) and TM (Transverse Magnetic Wave) polarized components. It further comprises a PLC (Planar Lightwave Circuit) 4 having a coherent mixer function, a lens 2-2 for condensing the collimated light at the PLC 4, and a metal carrier 11. It further comprises a PD (Photo Diode) 5 for performing optical-electrical conversion of an interference signal, and a TIA 6 for, on a current signal from the PD 5, performing impedance conversion, amplification and outputting as a voltage signal. It further comprises a wiring substrate 7, a substrate carrier 8, a lens 2-3 for collimating interference light emitted from the PLC 4, and a prism 9 accompanied by a lens which couples the interference light to the PD 5 by changing its optical path. The optical communication module of the present exemplary embodiment further comprises a ceramic package 10 which contains the above-described components. These components constitute an optical communication module 100 which functions as a digital coherent receiver module.

Figure 2:
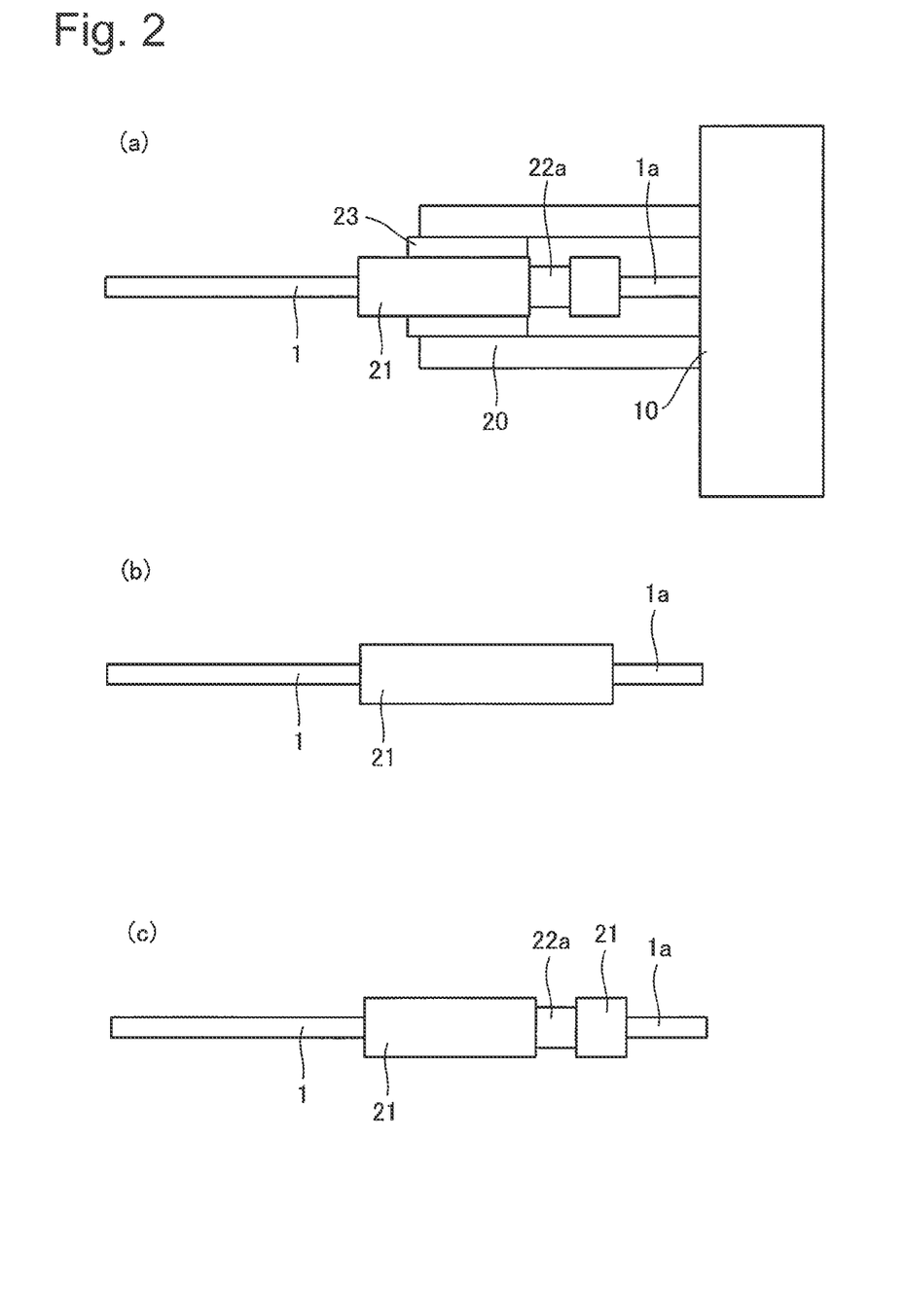
FIG. 2(a) is a cross-sectional view showing a configuration of a sealing structure of the optical communication module according to the first exemplary embodiment of the present invention.
FIG. 2(b) and FIG. 2(c) are side views for explaining an optical fiber array used in the sealing structure.

The optical communication module 100 is a light-receiving module which performs the following operation. At a stage prior to an optical interferometer arranged inside the coherent mixer, a received signal light is split into its TE and TM components. Then, the components are caused to have delayed interference with the local oscillator light, output signals for eight ports corresponding to four pairs are thus obtained, and signal demodulation is subsequently performed. In the light input part, the optical fiber array 1 containing optical fibers aligned in it is used, in order to enable inputting of light from two ports respectively for the signal light and the local oscillator light while allowing the package to be small in size. Because the optical fiber array 1 is mounted into the ceramic package 10, a cylindrical barrel unit 20 (refer to FIG. 2(*a*)) fixed to the ceramic package 10 is provided with no window for sealing.

Therefore, without relying on visual check by means of a window for sealing, there is realized a sealing environment for enabling uniform charging of solder 23 (refer to FIG. 2(*a*)) with respect to between a sealing flange 21 attached over the optical fiber array 1 and the inner surface of the barrel unit 20. For the sealing flange 21, metal is used, for example. A portion of the optical fiber array 1 is provided with metal coating (gold plating). The sealing flange 21 and the inner surface of the barrel unit 20 are gold plated so that the solder 23 in a molten state flows with high wettability on the gold-plated surfaces. Then, by optimizing the solder amount and the duration of molten state through such as the temperature and duration of local heating, the solder 23 is uniformly charged in the entire gap between the sealing flange 21 and the barrel unit 20. Further, a predetermined structure for stopping solder flow is provided on the surface of the flange 21. By this way, an advantage of preventing the solder from flowing up to a cable portion of the optical fiber contained in the optical fiber array 1 is achieved. Also achieved is an advantage that the solder 23 remains within the gap between the sealing flange 21 and the barrel unit 20 and accordingly the sealing by soldering is securely accomplished. Next, the predetermined structure for stopping solder flow will be described specifically.

FIG. 2(*a*) is a cross-sectional view of the barrel unit 20 as a sealing structure of the optical communication module according to the present exemplary embodiment, and FIG. 2(*b*) and FIG. 2(*c*) are side views for explaining an optical fiber array used in the sealing structure. In the present exemplary embodiment, a solder-flow stopping structure 22*a* formed by partial groove processing, such as shown in FIG. 2(*b*) and FIG. 2(*c*), is provided on the surface of the sealing flange 21 provided over the optical fiber array 1.

The optical fiber array 1 shown in FIG. 2(*c*), which is provided with the solder-flow stopping structure 22*a*, may be prepared as follows, for example. First, an optical fiber array 1 wrapped with the sealing flange 21, such as shown in FIG. 2(*b*), is prepared. Here, the entire surface of the sealing flange 21 of FIG. 2(*b*) is plated with gold. Next, by applying partial groove processing to a middle portion of the sealing flange 21, the optical fiber array 1 provided with the solder-flow stopping structure 22*a*, such as shown in FIG. 2(*c*), is formed.

Here, in the sealing flange 21, the surface of a grooved portion formed by the partial groove processing is covered with no gold plating layer. As a result, discontinuity of solder wettability is generated on the surface of the sealing flange 21. By adopting such a structure, the solder 23 in a molten and not-yet-solidified state is prevented from flowing into the solder-flow stopping structure 22*a* of the sealing flange 21 formed by the partial groove processing.

As a result of that the solder 23 thus stops flowing just before the grooved portion with no gold plating, it becomes possible to fill the gap between the sealing flange 21 and the barrel unit 20 efficiently with the solder 23. Accordingly, there is achieved an advantage of preventing the solder from reaching up to the cable portion of the optical fiber contained in the optical fiber array. Also achieved is an advantage that the solder 23 remains within the gap between the sealing flange 21 and the barrel unit 20 and accordingly, the sealing by soldering is securely accomplished.

Figure 6:
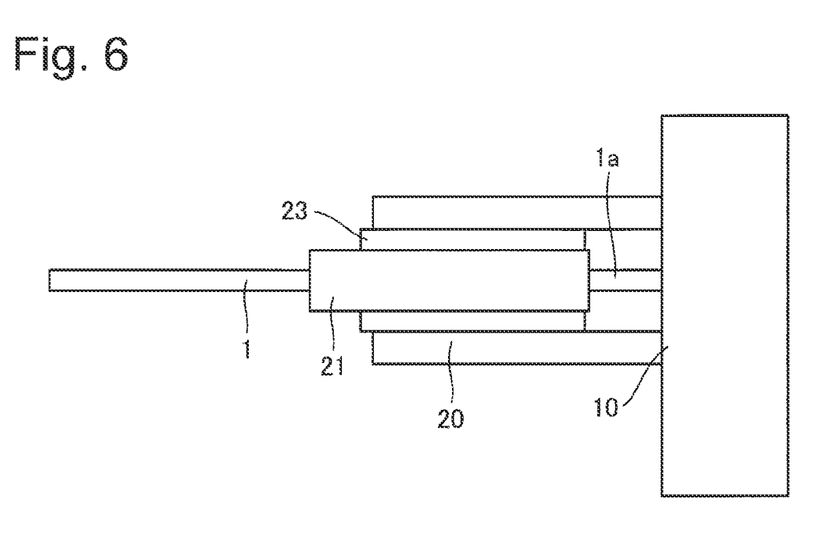
FIG. 6 is a cross-sectional view showing a configuration of a sealing structure of a related optical communication module using a flange.

Here, the advantageous effect of the present exemplary embodiment against a sealing structure of a related optical communication module will be verified. FIG. 6 shows a sealing structure of a related optical communication module where an optical fiber is provided with a cylindrical flange whose entire surface is gold plated, and the surface of the sealing flange is joined with the inner surface of a package barrel by soldering. In the case of such a simple cylindrical flange structure, when the inside of the optical communication module is not in a secure sealing environment, it is difficult to secure the reliability. The reason is as follows, specifically.

When no window structure is provided in the barrel unit (in a case of mounting an optical fiber array into the package, or the like), it is impossible to visually check the inside of the package barrel. In that case, it is impossible to check whether the sealing material is uniformly charged inside the barrel, whether the sealing is securely accomplished, or the like. Accordingly, if the solder amount is more than enough, it may occur that the solder flows even to a metal fiber surface 1*a*, thus causing deterioration of the characteristics. On the other hand, if the solder amount is less than enough, it may occur that the solder does not sufficiently penetrate into the gap between the sealing flange and the package, thus causing void formation which results in a failure (leak occurrence). In contrast, in the sealing structure of the optical communication module according to the present exemplary embodiment, as described above, even when the barrel unit is provided with no window structure, an appropriate amount of solder can be uniformly charged between the sealing flange and the barrel of the ceramic package. In this way, the reliability can be improved without affecting influence on the optical fiber characteristics.

Second Exemplary Embodiment

Figure 3:
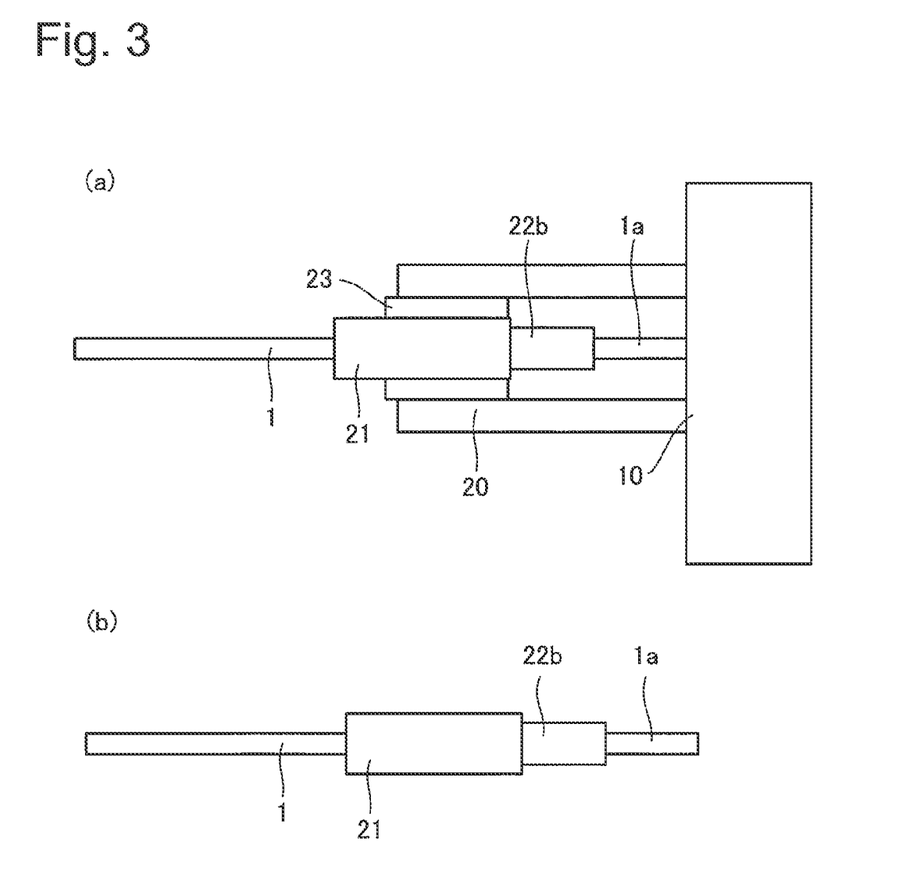
FIG. 3(a) is a cross-sectional view showing a configuration of a sealing structure of an optical communication module according to a second exemplary embodiment of the present invention.
FIG. 3(b) is a side view of an optical fiber array used in the sealing structure.

FIG. 3(*a*) is a cross-sectional view showing a configuration of a sealing structure of an optical communication module according to a second exemplary embodiment of the present invention, and FIG. 3(*b*) is a side view of an optical fiber array used in the sealing structure. Between the configuration of FIG. 3(*a*) and that of FIG. 2(*a*), there is a difference in the region to be processed into a grooved portion. There is no other difference between the configurations.

In the present exemplary embodiment, on the surface of a sealing flange 21 attached over an optical fiber array 1, there is provided a solder-flow stopping structure 22*b* formed by one-side groove processing, such as shown in FIG. 3(*a*) and FIG. 3(*b*). The optical fiber array 1 shown in FIG. 3(*b*), which is provided with the solder-flow stopping structure 22*b*, is fabricated by applying partial groove processing to a sealing flange 21 attached over an optical fiber array 1, such as shown in FIG. 2(*b*), at entire one side of the sealing flange 21.

For example, the optical fiber array 1 provided with the solder-flow stopping structure 22*b*, shown in FIG. 3(*b*), may be prepared as follows. First, an optical fiber array 1 wrapped with the sealing flange 21, such as shown in FIG. 2(*b*), is prepared. Here, the entire surface of the sealing flange 21 of FIG. 2(*b*) is plated with gold. Next, by applying groove processing to entire one side of the sealing flange 21, the optical fiber array 1 provided with the solder-flow stopping structure 22*b*, such as shown in FIG. 3(*b*), is formed. In the present exemplary embodiment, one side of the sealing flange 21 means a side of the sealing flange 21 which is to be the front side when the sealing flange 21 is inserted into the barrel unit 20.

Here, in the sealing flange 21, the surface of its entire one side having been thus grooved is covered with no gold plating layer. As a result, discontinuity of solder wettability is generated on the surface of the sealing flange 21. By adopting such a structure, the solder 23 in a molten and not-yet-solidified state is prevented from flowing into the solder-flow stopping structure 22b of the sealing flange 21 formed by the one-side groove processing.

As a result of that the solder 23 thus stops flowing just before the groove formed on the entire one side, which is with no gold plating, it becomes possible to fill the gap between the sealing flange 21 and the barrel unit 20 efficiently with the solder 23. Accordingly, there is achieved an advantage of preventing the solder from reaching even to the cable portion of the optical fiber. Also achieved is an advantage that the solder 23 remains within the gap between the sealing flange 21 and the barrel unit 20 and accordingly, the sealing by soldering is securely accomplished. In this way, the reliability can be improved without affecting influence on the optical fiber characteristics.

Third Exemplary Embodiment

Figure 4:
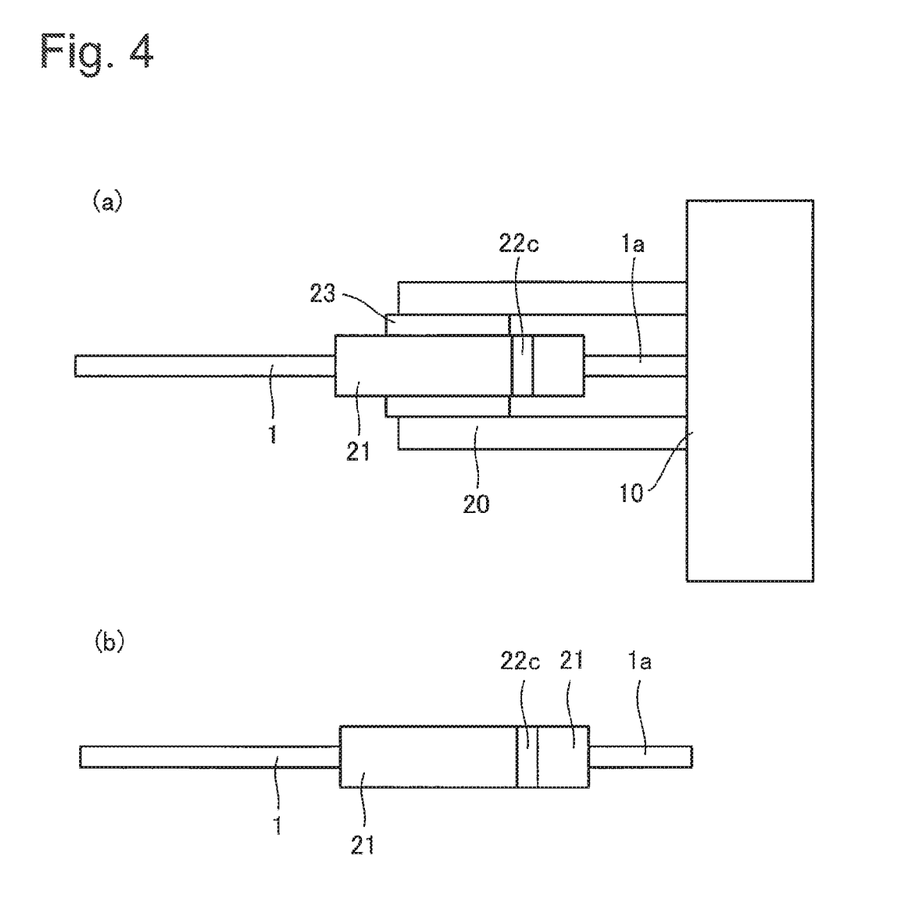
FIG. 4(a) is a cross-sectional view showing a configuration of a sealing structure of an optical communication module according to a third exemplary embodiment of the present invention.
FIG. 4(b) is a side view of an optical fiber array used in the sealing structure.
Figure 5:
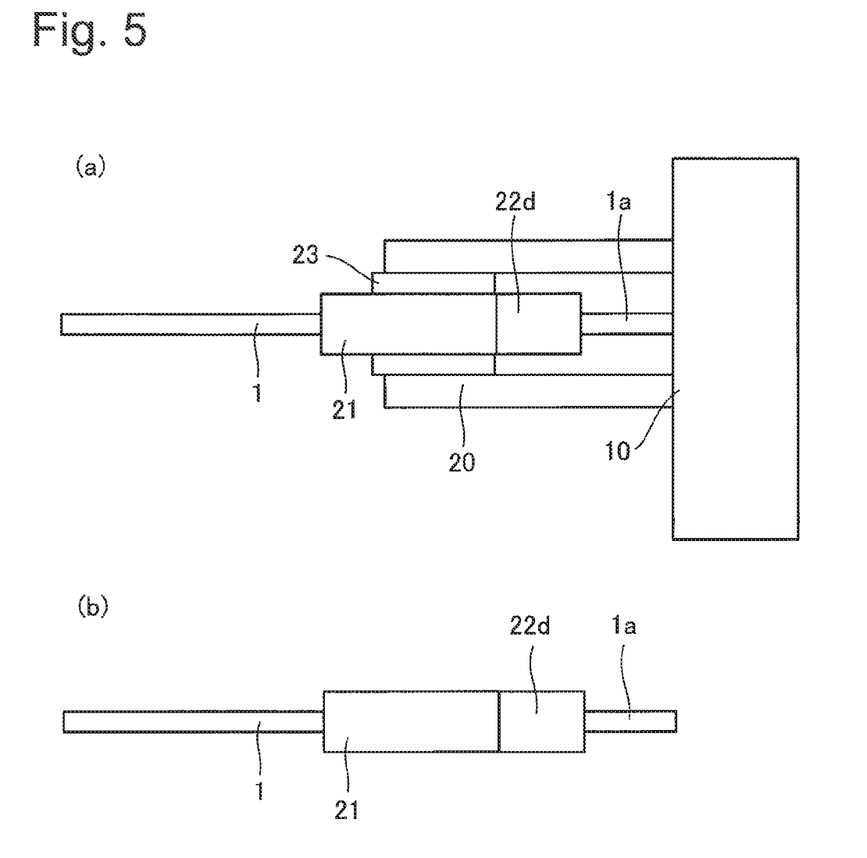
FIG. 5(a) is a cross-sectional view showing a configuration of a sealing structure of an optical communication module according to a fourth exemplary embodiment of the present invention.
FIG. 5(b) is a side view of an optical fiber array used in the sealing structure.

FIG. 4(a) and FIG. 5(a) are diagrams each showing a configuration of a sealing structure of an optical communication module according to a third exemplary embodiment of the present invention, and FIG. 4(b) and FIG. 5(b) are side views of optical fiber arrays used in respective ones of the sealing structures. Between the configurations shown in FIG. 4(a) and FIG. 5(a) and the configuration shown in FIG. 2(a), there is a difference in whether only a surface plating layer is removed or not. There is no other difference between the configurations.

In the sealing structure of the optical communication module shown in FIG. 4(a) and FIG. 4(b) according to the present exemplary embodiment, on the surface of a sealing flange 21 attached over an optical fiber array 1, there is provided a solder-flow stopping structure 22c corresponding to a portion, of the surface, coated with no surface plating layer. In the sealing structure of the optical communication module shown in FIG. 5(a) and FIG. 5(b) according to the present exemplary embodiment, on the surface of a sealing flange 21 attached over an optical fiber array 1, there is provided a solder-flow stopping structure 22d corresponding to entire one side, of the surface, coated with no surface plating layer.

The optical fiber array 1 shown in FIG. 4(b), which is provided with the solder-flow stopping structure 22c, may be prepared as follows, for example. First, an optical fiber array 1 wrapped with a sealing flange 21 such as shown in FIG. 2(b), which was already described in the first exemplary embodiment, is prepared. Here, the entire surface of the sealing flange 21 of FIG. 2(b) is plated with gold. Next, by removing the gold plating layer from the surface of a middle portion of the sealing flange 21, the optical fiber array 1 provided with the solder-flow stopping structure 22c, shown in FIG. 4(b), is formed.

The optical fiber array 1 shown in FIG. 5(b), which is provided with the solder-flow stopping structure 22d, may be prepared as follows, for example. First, an optical fiber array 1 wrapped with a sealing flange 21 such as shown in FIG. 2(b), which was already described in the first exemplary embodiment, is prepared. Here, the entire surface of the sealing flange 21 of FIG. 2(b) is plated with gold. Next, by removing the gold plating layer from the surface of one side of the sealing flange 21, the optical fiber array 1 provided with the solder-flow stopping structure 22d, shown in FIG. 5(b), is formed.

The sealing structures of the optical communication modules according to the present exemplary embodiment are provided with, respectively, the solder-flow stopping structure 22c corresponding to a portion, of the sealing flange, coated with no surface plating layer, and the solder-flow stopping structure 22d corresponding to entire one side, of the sealing flange, coated with no surface plating layer. That is, there is no gold plating layer on the surface of the solder-flow stopping structure 22c realized by partial absence of surface plating, and also on the surface of the solder-flow stopping structure 22d realized by one-side absence of surface plating. As a result, discontinuity of solder wettability is generated on the surface of the sealing flange 21. By adopting such a structure, the solder 23 in a molten and not-yet-solidified state is prevented from flowing into either the solder-flow stopping structure 22c by partial absence of surface plating or the solder-flow stopping structure 22d by one-side absence of surface plating, of the sealing flange 21.

As a result of that the solder 23 thus stops flowing just before the middle portion or the entire one side, both having no gold plating, it becomes possible to fill the gap between the sealing flange 21 and the barrel unit 20 efficiently with the solder 23. Accordingly, there is achieved an advantage of preventing the solder from reaching even to a cable portion of the optical fiber. Also achieved is an advantage that the solder 23 remains within the gap between the sealing flange 21 and the barrel unit 20 and accordingly, the sealing by soldering is securely accomplished. In this way, the reliability can be improved without affecting influence on the optical fiber characteristics.

A material for the sealing is not limited to the solder. A resin or the like may be used. Gold plating of the optical fiber cable portion is not essential. It is because the solder does not penetrate into that part, in the structures of the present invention. Further, it can be applied to optical fiber arrays including not only that containing two optical fibers but also that containing a larger number of optical fibers.

The present invention is not limited to the above-described exemplary embodiments, but various changes and modifications may be made to the present invention within the scope of the invention described in claims. It is obvious that also the changes and modifications are embraced within the scope of the present invention.

For example, in the present description, "having different degree of wettability of a flange surface" does not mean an absolute criterion but does a relative criterion.

Part or the whole of the above-described exemplary embodiments may be described as, but not limited to, the following supplementary notes.

(Supplementary note 1) A sealing structure of optical communication module comprising:

a cylindrical barrel unit fixed to a package;

a cylindrical flange disposed inside the barrel unit, through which an optical fiber pierces; and a sealing material disposed between the barrel unit and the flange, wherein the flange has on its surface a plurality of regions having different surface conditions, and the sealing material is disposed in only one of the regions.

(Supplementary note 2) The sealing structure of optical communication module according to supplementary note 1, wherein the surface conditions are different from each other in terms of wettability to the sealing material in a not-yet-solidified state.

(Supplementary note 3) The sealing structure of optical communication module according to supplementary note 2, wherein:

the regions having different degrees of wettability are each located on the outer surface of a corresponding one of portions of the flange, the portions being different in diameter from each other; and wettability of the flange surface is low in a grooved portion of the flange where the diameter is small, and is high in the portions other than the grooved portion.

(Supplementary note 4) The sealing structure of optical communication module according to supplementary note 2, wherein:

one of the regions having different degrees of wettability is a recess provided at entire one side of the flange; and wettability of the flange surface is low in the recess, and is high in the portions other than the recess.

(Supplementary note 5) The sealing structure of optical communication module according to supplementary note 2, wherein:

one of the regions having different degrees of wettability has its surface not plated, and the other ones of the regions have their surfaces plated; and wettability of the flange surface is low in the non-plated region, and is high in the plated regions.

(Supplementary note 6) The sealing structure of optical communication module according to supplementary note 2, wherein:

one of the regions having different degrees of wettability is a non-plated portion provided at entire one side of the flange, the flange being plated in its other portions; and wettability of the flange surface is low in the non-plated portion, and is high in the plated portions.

(Supplementary note 7) The sealing structure of optical communication module according to supplementary note 2, wherein:

a grooved portion is formed on the outer surface of the flange; and wettability of the flange surface is low in the grooved portion, and is high in the portions other than the grooved portion.

(Supplementary note 8) The sealing structure of optical communication module according to supplementary note 7, wherein:

the grooved portion of the flange is provided in a middle portion of the flange not including either of the end portions of the flange.

(Supplementary note 9) The sealing structure of optical communication module according to supplementary note 7, wherein:

the grooved portion of the flange is provided at entire one side of the flange.

(Supplementary note 10) The sealing structure of optical communication module according to supplementary note 2, wherein:

one of the regions having different degrees of wettability has its surface not plated, and the other ones of the regions have their surfaces plated; and wettability of the flange surface is lower in the non-plated region than in the plated regions.

(Supplementary note 11) The sealing structure of optical communication module according to supplementary note 2, wherein:

one of the regions having different degrees of wettability is a non-plated portion provided at entire one side of the flange, and the other portions have their surfaces plated; and wettability of the flange surface is lower in the non-plated portion than in the plated portions.

(Supplementary note 12) The sealing structure of optical communication module according to any one of supplementary notes 1 to 11, wherein the sealing material is solder.

(Supplementary note 13) The sealing structure of optical communication module according to any one of supplementary notes 1 to 12, wherein the optical fiber is covered with metal.

(Supplementary note 14) The sealing structure of optical communication module according to any one of supplementary notes 1 to 13, wherein the optical fiber is in the form of an optical fiber array.

(Supplementary note 15) A sealing method of optical communication module comprising:

disposing a cylindrical barrel unit in a package;

inserting into the barrel unit a cylindrical flange through which an optical fiber pierces;

filling a gap between the barrel unit and the flange with a molten sealing material;

disposing the molten sealing material at only one of a plurality of regions of the outer surface of the flange, the plurality of regions having different surface conditions; and then solidifying the molten sealing material.

(Supplementary note 16) The sealing method of optical communication module according to supplementary note 15, wherein the flange is prepared as a flange having a grooved portion formed on its outer surface, and is then inserted into the barrel unit, and the sealing material is then solidified.

(Supplementary note 17) The sealing method of optical communication module according to supplementary note 16, wherein the flange is prepared as a flange having a grooved portion formed on the outer surface of its middle portion not including either of its end portions, and is then inserted into the barrel unit, and the sealing material is then solidified.

(Supplementary note 18) The sealing method of optical communication module according to supplementary note 16, wherein the flange is prepared as a flange having a grooved portion formed on the outer surface of its entire one side, and is then inserted into the barrel unit, and the sealing material is then solidified.

(Supplementary note 19) The sealing method of optical communication module according to supplementary note 15, wherein the flange is prepared as a flange with its outer surface plated except at its middle portion, and is then inserted into the barrel unit, and the sealing material is then solidified.

(Supplementary note 20) The sealing method of optical communication module according to supplementary note 15, wherein the flange is prepared as a flange with its outer surface plated except at its entire one side, and is then inserted into the barrel unit, and the sealing material is then solidified.

This application is based upon and claims the benefit of priority from Japanese Patent Application No. 2013-236642, filed on Nov. 15, 2013, the disclosure of which is incorporated herein in its entirety by reference.

REFERENCE SIGNS LIST 1 optical fiber array
1a metal fiber surface
2-1, 2-2, 2-3 lens
3 PBS
4 PLC
5 PD
6 TIA
7 wiring substrate
8 substrate carrier
9 prism
10 ceramic package
11 metal carrier
20 barrel unit
21 sealing flange
22a solder-flow stopping structure by partial groove processing
22b solder-flow stopping structure by one-side groove processing.
22c solder-flow stopping structure by partial removal of surface plating
22d solder-flow stopping structure by one-side removal of surface plating
23 solder
100 optical communication module

The invention claimed is:

1. A sealing structure of optical communication module comprising:
   a cylindrical barrel unit fixed to a package;
   a cylindrical flange disposed inside the barrel unit, through which an optical fiber pierces; and
   a sealing material disposed between the barrel unit and the flange, wherein
   the flange has on its surface a plurality of regions having different surface conditions, and the sealing material is disposed in only one of the regions.

2. The sealing structure of optical communication module according to claim 1, wherein
   the surface conditions are different from each other in terms of wettability to the sealing material in a not-yet-solidified state.

3. The sealing structure of optical communication module according to claim 2, wherein:
   the regions having different degrees of wettability are each located on the outer surface of a corresponding one of portions of the flange, the portions being different in diameter from each other; and
   wettability of the flange surface is low in a grooved portion of the flange where the diameter is small, and is high in the portions other than the grooved portion.

4. The sealing structure of optical communication module according to claim 2, wherein:
   one of the regions having different degrees of wettability is a recess provided at entire one side of the flange; and
   wettability of the flange surface is low in the recess, and is high in the portions other than the recess.

5. The sealing structure of optical communication module according to claim 2, wherein:
   one of the regions having different degrees of wettability has its surface not plated, and the other ones of the regions have their surfaces plated; and
   wettability of the flange surface is low in the non-plated region, and is high in the plated regions.

6. The sealing structure of optical communication module according to claim 2, wherein:
   one of the regions having different degrees of wettability is a non-plated portion provided at entire one side of the flange, the flange being plated in its other portions; and
   wettability of the flange surface is low in the non-plated portion, and is high in the plated portions.

7. The sealing structure of optical communication module according to claim 1, wherein
   the sealing material is solder.

8. The sealing structure of optical communication module according to claim 1, wherein
   the optical fiber is covered with metal.

9. The sealing structure of optical communication module according to claim 1, wherein
   the optical fiber is in the form of an optical fiber array.

10. A sealing method of optical communication module comprising:
    disposing a cylindrical barrel unit in a package;
    inserting into the barrel unit a cylindrical flange through which an optical fiber pierces;
    filling a gap between the barrel unit and the flange with a molten sealing material;
    disposing the molten sealing material at only one of a plurality of regions of the outer surface of the flange, the plurality of regions having different surface conditions; and
    then solidifying the molten sealing material.

11. The sealing method of optical communication module according to claim 10, wherein
    the flange is prepared as a flange having a grooved portion formed on its outer surface, and is then inserted into the barrel unit, and
    the sealing material is then solidified.

12. The sealing method of optical communication module according to claim 11, wherein
    the flange is prepared as a flange having a grooved portion formed on the outer surface of its middle portion not including either of its end portions, and is then inserted into the barrel unit, and
    the sealing material is then solidified.

13. The sealing method of optical communication module according to claim 11, wherein
    the flange is prepared as a flange having a grooved portion formed on the outer surface of its entire one side, and is then inserted into the barrel unit, and
    the sealing material is then solidified.

14. The sealing method of optical communication module according to claim 10, wherein
    the flange is prepared as a flange with its outer surface plated except at its middle portion, and is then inserted into the barrel unit, and
    the sealing material is then solidified.

15. The sealing method of optical communication module according to claim 10, wherein
    the flange is prepared as a flange with its outer surface plated except at its entire one side, and is then inserted into the barrel unit, and
    the sealing material is then solidified.

* * * * *